(12) United States Patent
Bergeron et al.

(10) Patent No.: US 11,390,368 B2
(45) Date of Patent: Jul. 19, 2022

(54) DROGUE DEPLOYMENT FOR LIGHTER THAN AIR VEHICLE DESCENT

(71) Applicant: Aerostar International, Inc., Sioux Falls, SD (US)

(72) Inventors: Nicolas Bergeron, San Mateo, CA (US); Adam French, San Francisco, CA (US)

(73) Assignee: Aerostar International, Inc., Sioux Falls, SD (US)

(*) Notice: Subject to any disclaimer, the term of this patent is extended or adjusted under 35 U.S.C. 154(b) by 127 days.

(21) Appl. No.: 16/998,714

(22) Filed: Aug. 20, 2020

(65) Prior Publication Data

US 2022/0055732 A1 Feb. 24, 2022

(51) Int. Cl.
*B64B 1/00* (2006.01)
*B64D 17/70* (2006.01)

(52) U.S. Cl.
CPC .............. *B64B 1/005* (2013.01); *B64D 17/70* (2013.01)

(58) Field of Classification Search
CPC ................................ B64B 1/005; B64D 17/70
See application file for complete search history.

(56) References Cited

U.S. PATENT DOCUMENTS

| | | | | |
|---|---|---|---|---|
| 2,444,642 | A * | 7/1948 | Frieder | B64B 1/58 244/32 |
| 9,010,691 | B1 * | 4/2015 | Ratner | B64D 1/12 455/431 |
| 9,611,044 | B2 * | 4/2017 | Hiisilä | B64D 17/64 |
| 2015/0021427 | A1 * | 1/2015 | Heppe | B64B 1/06 244/31 |
| 2016/0332738 | A1 * | 11/2016 | Hiisilä | F41A 19/58 |
| 2017/0225792 | A1 * | 8/2017 | Wang | B64C 39/024 |
| 2019/0315474 | A1 * | 10/2019 | Manninger | B64D 17/80 |
| 2021/0031930 | A1 * | 2/2021 | Na | B60L 50/60 |
| 2021/0155343 | A1 * | 5/2021 | Ogden | B64C 39/024 |

* cited by examiner

*Primary Examiner* — Richard G Davis
(74) *Attorney, Agent, or Firm* — Schwegman Lundberg & Woessner, P.A.

(57) ABSTRACT

The technology relates to techniques for drogue deployment for a lighter than air (LTA) vehicle descent. A drogue deployment system for an LTA vehicle descent can include a drogue comprising a drogue parachute coupled to a carrier. A spring can be configured to launch the drogue from a launch tube directed outward from an apex of the LTA vehicle in an acute angle from a horizontal plane. A core can be placed around the launch tube and placed around the spring, the core compressing the spring and holding the spring in a compressed state prior to deployment, and a riser can couple the carrier to the envelope of the LTA vehicle. In some cases, the drogue deployment system can comprise two or more drogues, wherein intervals between the two or more drogues can be selected such that horizontal components of drogue deployment forces approximately cancel out.

13 Claims, 11 Drawing Sheets

DROGUE DEPLOYMENT FOR LIGHTER THAN AIR VEHICLE DESCENT

BACKGROUND OF INVENTION

Fleets of lighter than air (LTA) aerial vehicles are being considered for a variety of purposes, including providing data and network connectivity, data gathering (e.g., image capture, weather and other environmental data, telemetry), surveillance, and systems testing, among others. LTA vehicles can utilize a balloon envelope or a non-rigid hull filled with a gas mixture that is lighter than air to provide lift. The gas is released from the balloon envelope or a non-rigid hull to initiate a planned or unplanned descent of the LTA vehicle.

Drogue parachutes are parachutes that are deployed from rapidly moving objects to slow the object, or to provide control and stability. For example, drogue parachutes are used to shorten the landing of airplanes (e.g., when landing on aircraft carriers), and to slow fast moving land vehicles (e.g., drag racing vehicles and vehicles used to break land speed records). Drogue parachutes have also been used to stabilize the direction of an object in flight, such as for certain types of grenades, or spacecraft upon reentry. Drogue parachutes can also be used to deploy a main parachute (e.g., for a person skydiving) wherein the drag force generated by the drogue is used to open the main parachute.

BRIEF SUMMARY

The present disclosure provides techniques for drogue deployment for a lighter than air (LTA) vehicle descent. A drogue deployment system for an LTA vehicle descent can include a drogue comprising a drogue parachute coupled to a carrier, wherein the drogue parachute is configured to be wrapped around the carrier prior to deployment and to open after deployment; a launch tube coupled to an apex of an envelope of the LTA vehicle, the launch tube directed outward from the apex in an acute angle from a horizontal plane; a spring winding around the launch tube, the spring configured to launch the drogue; a core placed around an outer circumference of the launch tube and placed around the spring, the core compressing the spring and holding the spring in a compressed state prior to deployment; and a riser coupling the carrier to the envelope of the LTA vehicle, wherein: the carrier is placed over and substantially covers the launch tube and the core, the carrier comprising a narrower circumference in a portion beyond the core such that the spring can push the carrier off of the launch tube upon deployment; and the riser is connected to the carrier in a coiled manner. In an example, the drogue deployment system deploys two or more drogues positioned at intervals away from one another; and the two or more drogues are each configured to deploy from the drogue deployment system at acute angles from a horizontal plane. In another example, the intervals between the two or more drogues and the acute angles are selected such that horizontal components of drogue deployment forces used to deploy the two or more drogues approximately cancel out. In another example, the intervals between the two or more drogues and the acute angles are selected such that the drogues do not make contact with the apex of the lighter than air vehicle after the drogues are deployed and before the drogue parachutes are opened. In another example, the drogue deployment system deploys two drogues positioned at intervals of 180°, three drogues positioned at intervals of 120°, four drogues positioned at intervals of 90°, or six drogues positioned at intervals of 60°. In another example, the coiled riser is contained in a riser drum attached to the drogue carrier and unspools from the riser drum after the drogue is deployed. In another example, the drogue is configured to pull up on the envelope with respect to a payload of the LTA vehicle, thereby reducing the chance that the envelope will impact with the payload of the LTA vehicle during descent.

An LTA vehicle can include an envelope configured to hold gas and air; and a drogue deployment system, comprising: two or more drogues each comprising a carrier and a drogue parachute, each drogue directed outward from the apex in an acute angle from a horizontal plane at an interval away from another of the two or more drogues; two or more launch tubes coupled to an apex of the envelope; two or more springs, each spring winding around one of the launch tubes; two or more cores, each core placed around an outer circumference of the one of the launch tubes and placed around one of the springs, each core compressing one of the springs and holding that spring in a compressed state prior to deployment; and two or more risers, each riser configured to couple one of the carriers to the apex of the envelope; wherein: each of the carriers is placed over and substantially covers one of the launch tubes and one of the cores; each of the carriers comprises a narrower circumference in a portion beyond one of the cores such that the springs can push the carriers off of the launch tubes upon deployment; each of the drogue parachutes is coupled to one of the carriers, and is configured to be wrapped around one of the carriers prior to deployment and to open after deployment; each riser is connected to one of the carriers in a coiled manner; and the interval between each of the two or more drogues and the acute angles are selected such that horizontal components of drogue deployment forces used to deploy the two or more drogues approximately cancel out. In an example, the intervals between the two or more drogues and the acute angles are selected such that horizontal components of drogue deployment forces used to deploy the two or more drogues approximately cancel out. In another example, the intervals between the two or more drogues and the acute angles are selected such that the drogues do not make contact with the apex of the LTA vehicle in a time frame after the drogues are deployed and before the drogue parachutes are opened. In another example, the drogue deployment system deploys two drogues positioned at intervals of 180°, three drogues positioned at intervals of 120°, four drogues positioned at intervals of 90°, or six drogues positioned at intervals of 60°. In another example, the coiled riser is contained in a riser drum attached to the drogue carrier and unspools from the riser drum after the drogue is deployed. In another example, the drogues are configured to pull up on the envelope with respect to a payload of the LTA vehicle, thereby reducing the chance that the envelope will impact with the payload of the LTA vehicle during descent. In another example, the LTA vehicle further includes a payload comprising a solar panel, a broadband communications unit, and a terminal, wherein the drogues are configured to pull up on the envelope with respect the payload, thereby reducing the chance that the envelope will impact with the solar panel, broadband communications unit, or terminal of the LTA vehicle during descent.

Figure 1:
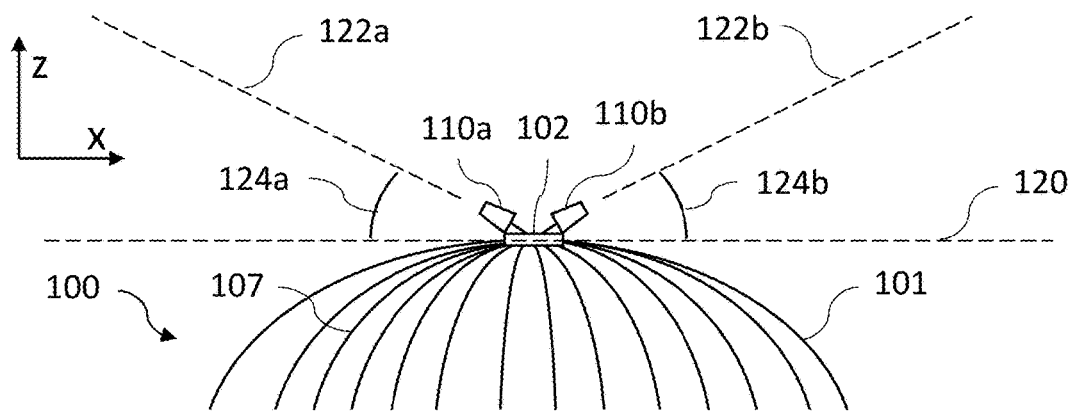
FIG. 1 is a simplified schematic of an example of a portion of an LTA vehicle in side view, comprising a drogue deployment system, in accordance with some embodiments.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The invention is directed to the use of drogues deployed from an apex (e.g., from an apex plate) of a lighter than air (LTA) vehicle to manage the descent of a balloon envelope or a non-rigid hull (hereinafter "envelope") of the LTA vehicle. The drogues can contain a carrier and a drogue parachute attached to the carrier. Such drogues may be deployed just prior to, during, or after the envelope of an LTA vehicle is burst or cut (or otherwise fully or partially deflated), and the drogues can be configured to assist the LTA vehicle make a controlled descent, whether planned or unplanned.

LTA vehicles that use the present systems and methods can include passive LTA vehicles (e.g., floating stratospheric balloons, other floating or wind-driven vehicles), or powered LTA vehicles (e.g., balloons and airships with some propulsion capabilities). The envelopes of LTA vehicles can contain a gas (e.g., hydrogen and/or helium) and air. The present drogue deployment systems and methods can, in some embodiments, provide additional lift to the envelope as it is deflating during the descent of the LTA vehicle. This has the effect of pulling up on the envelope with respect to the payload of the vehicle, which helps keep the LTA vehicle from being damaged during descent. For example, the drogues can help keep the envelope above the payload (with respect to the ground), which reduces the chance that the envelope will impact with the payload and damage components of the payload. In some embodiments, the present LTA vehicles also have one or more main parachutes, which deploy after the LTA vehicle descent is initiated and slow the descent velocity of the LTA vehicle during a planned or unplanned descent. The main parachute(s) slow the descent velocity of the LTA vehicle such that the payload is not damaged (or the damage to the payload is reduced) when the LTA vehicle lands.

In some examples, drogues described herein may be deployed prior to a planned descent (e.g., intentional termination of flight). In other examples, such drogues may be deployed at or soon after a planned or unplanned descent (e.g., an unexpected burst or other unexpected failure requiring immediate termination of flight).

In some cases, the flight is terminated (e.g., the LTA envelope bursts), and the drogues are deployed from an unsupported (or a minimally supported) apex plate. After the flight is terminated and the LTA vehicle begins to descend, the drogues can be configured to pull up on an apex of the envelope. In some cases, more than one drogue deployment system can be coupled to the envelope, and the drogues can pull up on the envelope at more than one location. The force(s) provided by the drogues can keep the envelope away from the payload and other components of the LTA vehicle. Without the drogues providing an upward force on the envelope after flight termination the different components of the LTA vehicle can move erratically, which can cause damage to the components. For example, the envelope and/or tendons between the apex of the envelope and a base of the envelope (e.g., at an altitude control system) can impact sensitive components (e.g., communications systems) on the payload causing damage. The drogues help prevent such damage by keeping the envelope away from the payload.

Additionally, the force(s) provided by the drogues can cause the envelope to elongate and help keep the LTA vehicle more streamlined (i.e., have less drag) during descent. In some cases, an LTA vehicle has two main sections, an envelope and a payload, which are connected to one another by a connection component (e.g., a down connect). In some such cases, the drogues ensure that the envelope section has more drag and a slower terminal velocity than the payload section, which results in the envelope section staying above the payload section during descent and also results in the envelope section elongating because it is pulled up by the drogues (at the apex of the envelope) and down by the payload (at the base of the envelope). During the initial phases of the descent (i.e., the phases of descent before the main parachute(s) are deployed), the streamlined LTA vehicle can have a faster descent speed than an LTA vehicle with an envelope that is unsupported by the present drogue systems and methods, which can be advantageous for several reasons. For instance, a faster descent speed in the initial stages of descent can improve the accuracy of predicting a landing location. Once a flight is terminated, a prediction of the landing location can be useful because it can enable one to more easily recover the LTA vehicle after it lands. If the LTA vehicle is descending more slowly, then winds have a greater chance to affect the landing location of the LTA vehicle than if the LTA vehicle is descending more quickly. The main parachutes can then be deployed as late in the descent as possible to ensure that the descent velocity of the LTA vehicle is slow enough to avoid damage (e.g., due to dynamic pressure and/or impacting the ground upon landing) and to improve the accuracy of predicting the landing location. Additionally, for high altitude LTA vehicles (e.g., ones that fly in the stratosphere) it can be advantageous to descend more quickly through airspace altitudes used by airplanes because it will cause less disruption to airplanes.

The acceptable descent velocity for an LTA vehicle during the initial stages of descent (before the main parachute(s) open) can vary and is largely based on maximum acceptable dynamic pressure. Dynamic pressure is defined by the equation q=0.5*air density*v2, where q is dynamic pressure, v is the descent velocity, and air density increases as altitude decreases. The drogues can also be configured to provide enough drag such that a terminal velocity of the LTA vehicle during descent does not exceed a certain dynamic pressure (e.g., that could cause damage to components of the LTA vehicle). There is a potential trade off in drogue design (e.g., for drogue parachute size), because a drogue parachute requires a minimum dynamic pressure to inflate, but as the dynamic pressure increases the drogues become more effective and provide more drag, which slows the LTA vehicle and reduces the dynamic pressure.

A drogue may be configured to provide drag on a balloon or non-rigid hull envelope during an LTA vehicle's descent to help prevent the envelope from collapsing on a payload or other underlying structure prematurely. A drogue may comprise a drogue parachute and a carrier. In some cases, the drogue parachute is wrapped around and/or over the carrier. The carrier can be configured to be placed over a launch tube and a core. The launch tube is mounted onto a structure on the apex of the envelope (e.g., an apex plate, or a load ring on an apex plate) at an acute angle from a horizontal plane. In some embodiments, a spring mechanism is used in conjunction with the launch tube to launch (or deploy) the drogue (i.e., parachute and carrier) off the core. The propulsion system(s) used to deploy the drogues can be spring systems, compressed gas systems, small explosive devices (i.e., squibs), small hot gas generators (i.e., small rocket motors), and/or any mechanism or device which would convert stored energy to linear kinetic energy, in different embodiments. At the base of the carrier may be a housing (e.g., a riser drum) containing a riser (e.g., coil of ribbon, rope, string), where the riser is coupled on one end to the carrier and on the other end to the apex, either directly or indirectly (e.g., by a mount, or other structure coupled to the apex of the envelope). In some examples, the riser may comprise a ribbon with a sufficient strength profile to withstand a range of forces from drogue parachute deployment. The length of the riser can be from 70 feet to 100 feet, or from 20 feet to 200 feet. The riser can be made from a material such as a Kevlar (i.e., fibers containing polyparaphenylene terephthalamide) or Dyneema (i.e., fibers containing ultra-high-molecular-weight polyethylene) ribbon. In some cases, a riser shaped like a ribbon is used instead of a line-shaped riser because a riser shaped like a ribbon can have improved drag characteristics. For example, a riser shaped like a ribbon can produce more lift for itself than a line-shaped riser, thereby holding its own weight in a freefall condition and limiting the risk that the riser becomes entangled (e.g., with itself or other components of the LTA vehicle).

In some embodiments, springs are used to launch (or deploy) the drogues that have spring constants from 2.5 kN/m to 5.5 kN/m, or from 1 kN/m to 10 kN/m. The spring energy, which is proportional to the spring constant times the spring compression squared, can be configured to be large enough to launch the drogues an acceptable distance upon deployment. For example, the spring energy can be about 30 J, or from 10 J to 100 J. However, the spring energies needed can vary considerably with the application (e.g., with the size and mass of the drogue being deployed to manage the descent of an LTA vehicle), and therefore can be less than 10 J or greater than 100 J in some applications. In some embodiments, the core, launch tube and spring are configured to compress the spring and hold the spring in a compressed state prior to placing the drogue (i.e., the drogue carrier and drogue parachute) onto the launch tube and core. This can be accomplished using a strap that holds the spring in a compressed state after the spring is compressed. The strap is then released or cut by a deployment mechanism, which allows the spring to decompress and deploy the drogue. For example, the strap can be fed through a squib component that is configured to cut the strap to deploy the drogue. In some cases, the drogue carrier also clips onto the core, which locks the drogue in place. In some embodiments, this clip mechanism is also unlocked by the drogue deployment mechanism, while in some embodiments, the core remains coupled to the carrier and travels with the drogue after the drogue is deployed. Examples of drogue deployment systems are described further herein. In some cases, the spring is covered with a sleeve, which can prevent the riser from becoming tangled with the spring after the drogue is deployed. In some cases, the drogues each contain a safety system to prevent the drogue from being deployed prematurely. For example, mechanical locks or pins can be attached to portions the drogue, which are removed prior to flight, to prevent the drogue from deploying before the LTA vehicle is flown.

In some cases, the carrier is weighted to stabilize the drogue after deployment and before the drogue parachute opens. For example, a weighted carrier can keep the bottom of the drogue oriented approximately downwards (relative to the ground) such that the parachute faces the correct direction when it is opened from the top of the drogue. This can be helpful, because at low dynamic pressures (e.g., when the descent velocity of the balloon is low and/or at high altitudes when the air pressure is low) the drogues do not have enough airflow to fully inflate, and the mass of the carrier can help keep the drogue in the right orientation to receive incoming air. In some examples, the carrier may be weighted such that the drogue drops downward relative to the apex (e.g., below a horizontal plane, or altitude, of the apex) upon deployment and before the drogue parachute opens. The weighted carrier may be carried upward relative to the apex along with the drogue parachute (e.g., above the horizontal plane, or altitude, of an apex of the vehicle) after the drogue parachute has opened sufficiently, since the carrier is coupled to, and hanging downward from, the opened drogue parachute. In some cases, the mass of the carrier is from 10 g and 200 g, or from 10 g and 100 g, or is about 50 g. In some cases, the mass of each drogue (e.g., including the carrier and parachute) is from 500 g to 2 kg, or from 500 g to 1.5 kg, or is about 1 kg. In some cases, the carrier is relatively light, has a relatively low amount of drag, and/or has a relatively high mass density compared to the drogue parachute.

The drogues (i.e., drogue carriers with drogue parachutes attached) are deployed using a drogue deployment system. The system imparts a drogue deployment force to deploy each of the drogues, thereby moving them away from the apex of the LTA vehicle. In some embodiments, each drogue is deployed in a direction that is at an acute angle from a horizontal plane intersecting the apex of the LTA vehicle, or at an angle that is from 0° to 30°, or 0° to 45° or from 0° to 60°, or from 0° to 90°, or from about 30° to about 50°, or about 38.5°, or about 40°, or about 45°, above a horizontal plane intersecting the apex of the LTA vehicle, or substantially horizontally from the apex of the LTA vehicle. The drogue parachutes can then be opened after drogue deployment. In some embodiments, the drogues contain mechanisms for opening the drogue parachutes. For example, a pin can be configured to hold the drogue parachute in place on the carrier, and the drogue can contain a mechanism that pulls the pin after the riser is uncoiled (e.g., by attaching the pin to the riser near the end of the riser (e.g., about 6 inches from the end of the riser) that is attached to the carrier), which allows the parachute to open via the force of air flow as the LTA vehicle descends. For example, a harness can be used to hold the drogue parachute closed (e.g., by wrapping around the drogue) and a pin can be fed through the harness such that when the pin is pulled the harness can come undone thereby allowing the drogue parachute to open. In some cases, the harness can contain a strap with a loop at either end, and the loops can be positioned around the pin such that the harness is held in place by the pin. In such cases, before opening the parachute, the strap is wrapped around the drogue parachute holding it closed, and after the pin is pulled (e.g., by the riser as it is uncoiling) the strap is no longer held in place and the parachute can open. In other cases, a drogue parachute can be opened by removing a mesh covering (e.g., by attaching the mesh covering to the riser near the end of the riser that is attached to the carrier). The drogue parachute can be opened when reaching the end of the riser, or at a certain predetermined distance from the LTA vehicle, or at a certain predetermined time after the drogue is deployed, or based on another event (e.g., upon reaching a predetermined descent velocity).

As the LTA vehicle descends and the drogue parachutes begin to open, the drogue parachutes are configured to catch air to open more fully. As the drogue parachute opens more fully, the drogue may surf a wake of turbulence (e.g., caused by the descending LTA vehicle), bringing the carrier substantially upward with it. The wake can contain air currents moving in a substantially upward arching trajectory resulting from the substantially downward trajectory of the LTA vehicle in descent. In some embodiments, the drogue surfs a wake causing the drogue to move outward (i.e., away from the apex of the LTA vehicle). In some embodiments, as the balloon shrinks, the wake gets smaller, and the carriers move inwards and rise upwards. In some embodiments, deploying the drogues from the apex of the LTA vehicle in a substantially horizontal direction enables the drogues to surf the wake, which prevents the drogues from getting too close to the LTA vehicle (e.g., and falling back onto the apex plate before the parachute opens). In some cases, the risers are long enough such that the drogues can be located outside of the turbulence caused by the descending LTA vehicle. The drogue parachutes described herein can have diameters from 0.5 m to 5 m, from 1 m to 5 m, from 1 m to 3 m, or from 2 m to 3 m. In other embodiments, the drogue parachutes can have larger or smaller diameters than those listed, depending on factors such as the number of drogues used, and the size and mass of the LTA envelope and/or of the LTA vehicle.

At least two drogues may be deployed at an acute angle from a horizontal plane (e.g., substantially horizontally), and substantially opposite each other, from an apex of an LTA vehicle. The substantially horizontal direction of deployment can prevent the drogues from falling back, or from being pulled back, onto the apex of the LTA vehicle prior to the drogue parachutes opening. Deploying two or more drogues in opposing directions (e.g., at approximately the same time) balances the forces between the deploying drogues, which minimizes the need for other mechanisms to balance the force of deploying any one drogue. Such drogue deployment systems that utilize multiple drogues can improve the distance a drogue can be deployed for a given drogue deployment force (as opposed to systems where the drogue deployment forces are not balanced). Such drogue deployment systems can also assist with deploying drogues from LTA vehicles that are partially deflated because the drogues are deployed in a substantially horizontal direction and the reaction forces of deploying the drogues in such systems are balanced thereby causing less total force on the partially deflated LTA vehicle compared to drogue deployment systems that do not launch the drogues substantially horizontally and/or are not configured to balance the drogue deployment forces. Multiple drogues are also beneficial because if one or more drogues are damaged (e.g., when an LTA envelope fails) the remaining drogues can still be deployed.

In some examples, drogue deployment may be triggered manually or automatically. In some examples, deployment may be triggered using squibs, mechanical cutting mechanisms (e.g., triggered by displacement due to the turbulence or vibrations associated with an envelope bursting), timed UV degradation, or other mechanisms. Not to be limited by theory, when an LTA envelope fails, it can cause the components of the LTA vehicle to experience large forces, e.g., from 20 G's to more than 100 G's. These large acceleration forces caused by the envelope failing can be used to trigger a mechanical triggering mechanism (e.g., an inertial triggering mechanism) to launch a drogue. In different designs, inertial triggering mechanisms can use blades, pins that drop, springs, moving bearings, and/or squibs (i.e., miniature explosive devices) to launch a drogue based on an experienced acceleration. For example, a trigger mechanism can contain a blade configured to cut a retaining strap, where cutting the retaining strap triggers the launch of a drogue. The blade can be attached to a mass and a pivot point such that the blade moves in response to an acceleration (e.g., caused by an LTA envelope failing) and the movement causes the blade to cut the retaining strap. The acceleration can cause a linear or a rotational displacement of a component of the inertial triggering mechanism, which causes the blade to move and cut the retaining strap. In some cases, an inertial triggering mechanism can contain a capsule with a bearing inside the capsule, wherein the bearing moves within the capsule in response to an acceleration and upon moving actuates a circuit to launch the drogue (e.g., using a circuit powered by a battery and an electrically fired squib). In some cases, a drogue can be deployed manually prior to a planned descent using a triggering mechanism described herein (e.g., by firing a squib in response to a provided electrical signal). In the case of manual deployment, the drogues may be deployed before, during or after a flight termination system cuts one or more holes in the LTA envelope to terminate the LTA vehicle flight. In some cases, it may be beneficial to deploy the drogues before the LTA vehicle begins to descend too quickly, since the dynamic pressure at high descent velocities can damage the drogue deployment mechanisms rendering the drogues unable to deploy.

In some cases, the riser is initially in a coiled state, wherein one end of the riser is attached to the carrier, the other end is attached (directly or indirectly) to the apex of the LTA vehicle, and the coiled riser is contained in a housing (e.g., a riser drum) attached to the carrier. In such cases, the majority of the riser travels with the drogue after the drogue is launched, and unspools from the riser drum on the drogue carrier. In other cases, the riser is coiled and the coiled riser is contained in a housing (e.g., a riser drum) attached to the LTA vehicle apex. In these cases, the majority of the riser stays with the LTA vehicle after the drogue is launched, and unspools from the riser drum attached to the LTA vehicle.

In some embodiments, the riser drum contains a mechanism for containing the riser prior to drogue deployment in order to prevent the riser from uncoiling (i.e., unspooling) prematurely (e.g., during drogue deployment system assembly, or during an LTA vehicle flight prior to flight termination). For example, the riser coil can be contained using a clip that releases when the drogue is deployed allowing the riser to begin to unspool. An extra riser piece (e.g., a service loop) can also be used to allow the coiled riser to begin to unspool from the riser drum upon drogue deployment. In some cases, the riser can be held in a coiled state using a stitch of thread (i.e., a rip stitch) that is configured to come undone when the drogue is deployed and the riser begins to unspool.

Example Systems

FIG. 1 is a simplified schematic of an example of a portion of an LTA vehicle 100 in side view, comprising a drogue deployment system. The drogue deployment system contains two drogues 110a and 110b, and is coupled to an apex plate 102 of the LTA vehicle 100. In some examples, LTA vehicle 100 may be a passive vehicle, such as a balloon or satellite, wherein most of its directional movement is a result of environmental forces, such as wind and gravity. In other examples, the LTA vehicle 100 may be actively propelled. In some embodiments, LTA vehicle 100 communicates with a ground station (not shown). FIG. 1 only shows a portion of LTA vehicle 100, which in this embodiment further includes balloon 101, apex plate 102, and tendons 107. In some examples, apex plate 102 may provide structural and electrical connections and infrastructure. Apex plate 102 may be positioned at the apex of balloon 101 and may serve to couple together various parts of balloon 101, for example using tendons 107. In some examples, apex plate 102 may include a flight termination unit, such as one or more blades and an actuator to selectively cut a portion and/or a layer of balloon 101 to initiate a descent of LTA vehicle 100. The LTA vehicle 100 may include structural and electrical connections and infrastructure, including components (e.g., fans, valves, actuators, etc.) used to, for example, add and remove air from balloon 101 (i.e., in some examples, balloon 101 may include an interior ballonet within its outer, more rigid shell that is inflated and deflated), causing balloon 101 to ascend or descend. Balloon 101 may comprise a balloon envelope containing lightweight and/or flexible latex or rubber materials (e.g., polyethylene, polyethylene terephthalate, chloroprene) and tendons 107 (e.g., attached at one end to apex plate 102 and at another end to a portion of the LTA vehicle 100 below the balloon 101) to provide strength to the balloon structure. In various embodiments, balloon 101 may be non-rigid, semi-rigid, or rigid.

The drogues 110a and 110b in this example are configured to be deployed in directions 122a and 122b, respectively, and at angles 124a and 124b, respectively. The angles 124a and 124b are defined from a horizontal plane 120. The horizontal plane 120 intersects the apex plate 102, and is approximately parallel to the apex plate 102 (e.g., is approximately parallel to a major surface or a major dimension of the apex plate 102, which are approximately parallel to direction x in FIG. 1). As described above, the angles 124a and 124b are acute angles from the horizontal plane 120 intersecting the apex of the LTA vehicle. Angles 124a and 124b can be from 0° to 90° above horizontal plane 120, from 0° to 60° above horizontal plane 120, from 0° to 30° above horizontal plane 120, or from about 30° to about 50° above the horizontal plane, or at about 40° above the horizontal plane, where the direction "above" is shown by direction z in FIG. 1. Directions 122a and 122b can be substantially horizontal (e.g., from 0° to 45° above horizontal plane 120) directions from the apex of the LTA vehicle, in some embodiments.

The drogue deployment system shown in FIG. 1 contains two drogues 110a and 110b, which are arranged to deploy in directions 122a and 122b (e.g., substantially horizontally), and substantially opposite each other, from the apex of LTA vehicle 100. In some embodiments, the substantially horizontal direction of deployment can prevent the drogues from falling back, or from being pulled back, onto the apex plate 102 of the LTA vehicle 100 prior to the drogue parachutes opening. Deploying the two drogues 110a and 110b in opposing directions (e.g., at approximately the same time) balances the forces between the deploying drogues, which minimizes the need for other mechanisms to balance the force of deploying any one drogue. In this example, the drogues are positioned with an interval of 180° between them. In the case where the drogue deployment angles are 0° from the horizontal plane 120, then the drogue deployment forces can be cancelled out (or approximately cancel out, or almost completely cancel out, or largely cancelled out). In cases where the drogue deployment angles are greater than 0° above the horizontal plane 120, then the horizontal components (e.g., those approximately parallel with horizontal plane 120) of the drogue deployment forces can be cancelled out (or approximately cancel out, or almost completely cancel out, or largely cancelled out), however, there will still be an overall vertical (i.e., perpendicular to the horizontal plane 120) reaction force that cannot be completely cancelled out. In some cases, the vertical components of the reaction forces push against the envelope, which provides a significant resistance in the vertical direction, and no significant displacement of the balloon vehicle in the vertical direction occurs. In contrast, horizontal reaction forces (e.g., from drogue deployment forces that are not balanced) can cause significant displacement of the LTA vehicle.

Figure 2A:
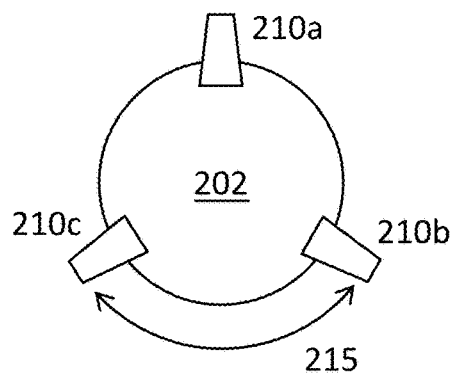
FIGS. 2A, 2B and 2C are simplified schematics of different examples of apex plates as viewed from above, each containing multiple drogues which are arranged to deploy in directions with acute angles from a horizontal plane from an apex of an LTA vehicle, in accordance with some embodiments.
Figure 2B:
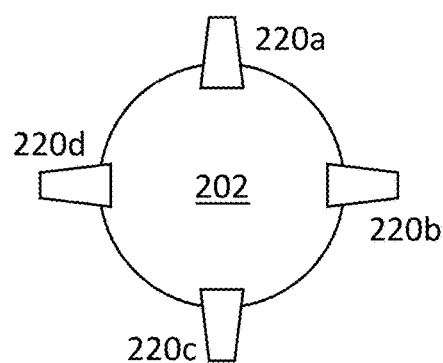
Figure 2C:
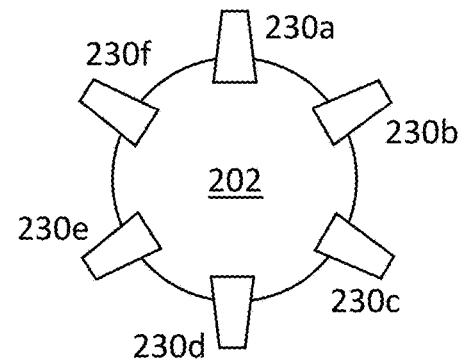

FIGS. 2A, 2B and 2C are simplified schematics of different examples of apex plates 202 as viewed from above, each containing multiple drogues which are arranged to deploy in directions with acute angles from a horizontal plane from an apex of an LTA vehicle (e.g., in directions similar to 122a and 122b shown in FIG. 1, or substantially horizontally), such that the drogue deployment forces (or the horizontal components of the drogue deployment forces) can be balanced. FIG. 2A shows an example with three drogues 210a-c arranged in an approximately equilateral triangular pattern, such that when all three drogues 210a-c are deployed approximately simultaneously the forces of deployment (or the horizontal components of the drogue deployment forces) can be largely balanced with one another. The interval 215 between the drogues in this case is approximately 120°. FIG. 2B shows an example with four drogues 220a-d arranged in an approximately rectangular (or square) pattern, such that when all four drogues 220a-d are deployed approximately simultaneously the forces of deployment (or the horizontal components of the drogue deployment forces) can be largely balanced with one another. The interval between the drogues in this example is approximately 90°. FIG. 2C shows an example with six drogues 230a-f arranged in an approximately regular hexagonal pattern, such that when all six drogues 230a-f are deployed approximately simultaneously the forces of deployment (or the horizontal components of the drogue deployment forces) can largely be balanced with one another. The interval between the drogues in this example is approximately 60°.

Figure 3:
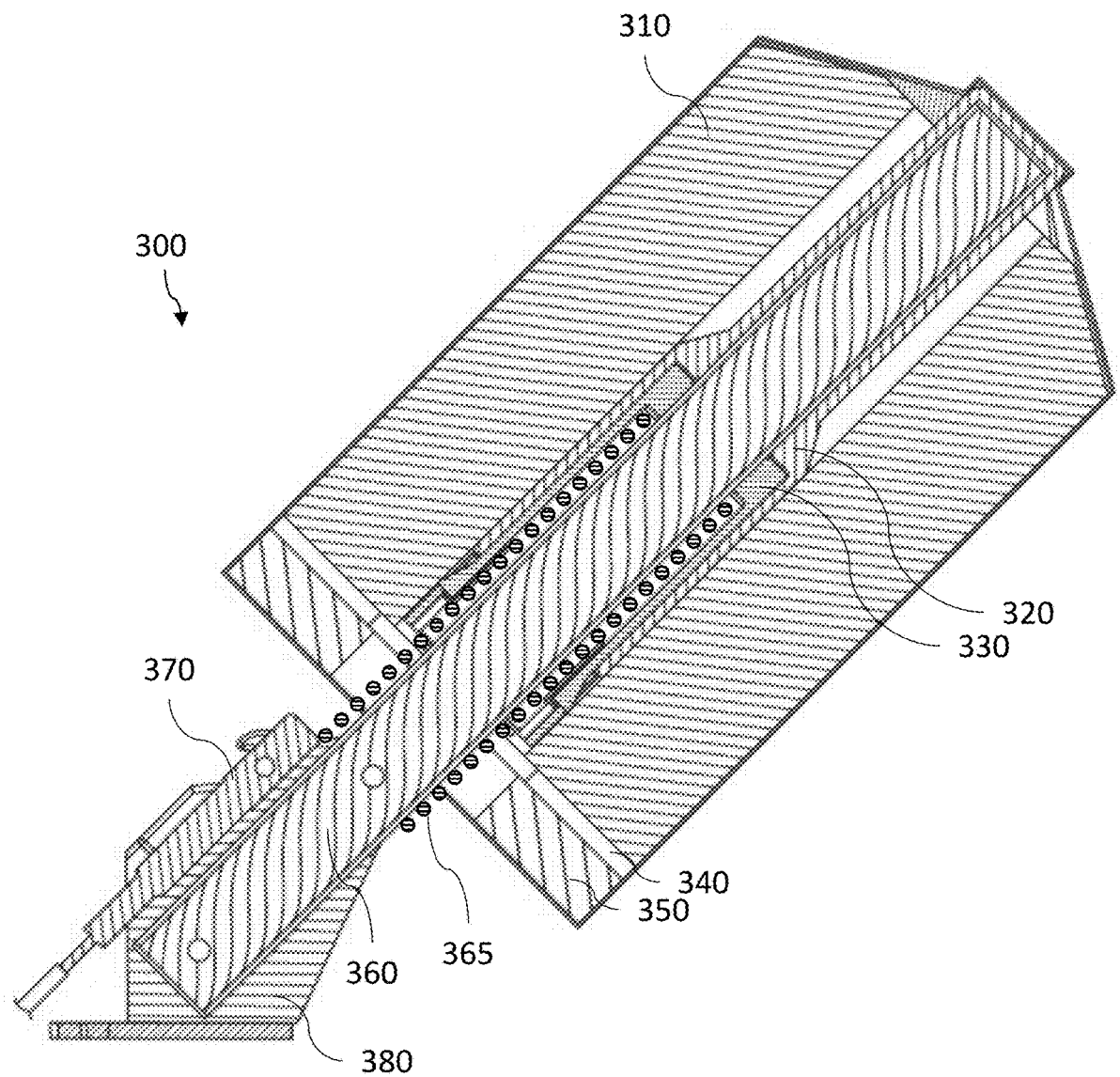
FIG. 3 is a simplified schematic of an example of a portion of a drogue deployment system in side view, in accordance with some embodiments.

FIG. 3 shows a simplified schematic of an example of a portion of a drogue deployment system 300. The portion of the drogue deployment system 300 in this example contains a drogue containing a drogue parachute 310 and a carrier 320, a core 330, a riser drum 340 that holds a riser coil 350, a launch tube 360, a spring 365, a portion of a drogue deployment mechanism 370, and a support structure 380 coupling this portion of the drogue deployment system to an apex plate of an LTA vehicle (not shown). The portion of the drogue deployment mechanism 370 shown in FIG. 3 includes a squib which is used to deploy the drogue. Other components of the drogue deployment mechanism are shown in FIG. 4 and are described further herein.

Figure 4:
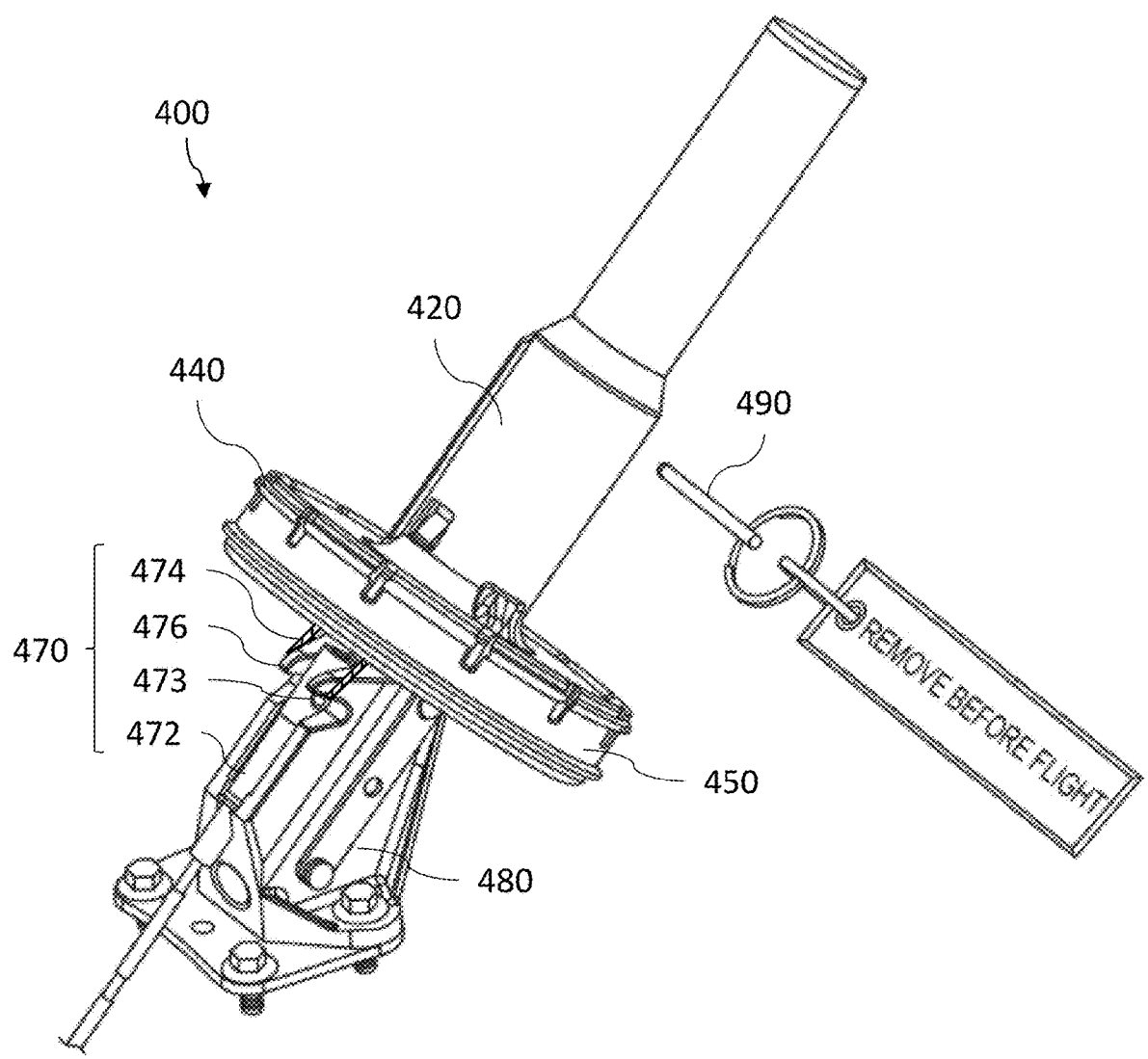
FIG. 4 is a simplified schematic of an example of a portion of a drogue deployment system in projection view, in accordance with some embodiments.

FIG. 4 shows a simplified schematic of an example of a portion of a drogue deployment system 400, shown in perspective view. The portion of the drogue deployment system 400 in this example contains a carrier 420, a riser drum 440 that holds a riser coil 450, a drogue deployment mechanism 470, a support structure 480 coupling this portion of the drogue deployment system to an apex plate of an LTA vehicle (not shown), and a safety pin 490. The drogue deployment mechanism 470 in this example contains a squib 472 with a hole 473, a strap 474, and prongs 476. The strap 474 is coupled to the core (not shown), goes under prongs 476 in the support structure 480, and is fed through a hole 473 in the squib 472, such that the strap holds the core to the support structure 480 and the core holds the spring in a compressed state. To deploy the drogue, the squib 472 fires, which cuts the strap 474 thereby releasing the core from the support structure 480, which allows the spring to decompress and the spring pushes the core off of the launch tube launching the drogue. For example, the squib can contain a hard wedge and the strap can be seated on a backing plate within the hole 473, such that when the squib fires the strap is cut by the hard wedge. In other embodiments, the carrier or another component can be used to hold the spring in a compressed state, and the drogue deployment mechanism can work similarly to the system described above using a strap that holds the carrier or other component to the support structure 480. For example, a different component (rather than a strap) can be used to hold the core (or carrier) in place and the spring in a compressed state, such as a clip or a pin. In such cases, the drogue deployment mechanism can release the component (e.g., unclip the clip or remove the pin) to release the core and allow the spring to decompress. The safety pin 490 has been removed prior to loading the carrier onto the launch tube and core. The safety pin 490 was inserted through the launch tube at a position above the top of the core to prevent the drogue from launching prematurely.

FIGS. 5A-5D are simplified schematics showing an example of a drogue deployment from an LTA vehicle at different instances in time. FIGS. 5A-5D contain an LTA vehicle envelope 501 (e.g., a balloon), an apex plate 502, two drogues 510 and 512, a drogue parachute 515, a carrier 520, a riser 550, a coupling 555 between one end of the riser and the apex plate 502, and a spring 565.

Figure 5A:
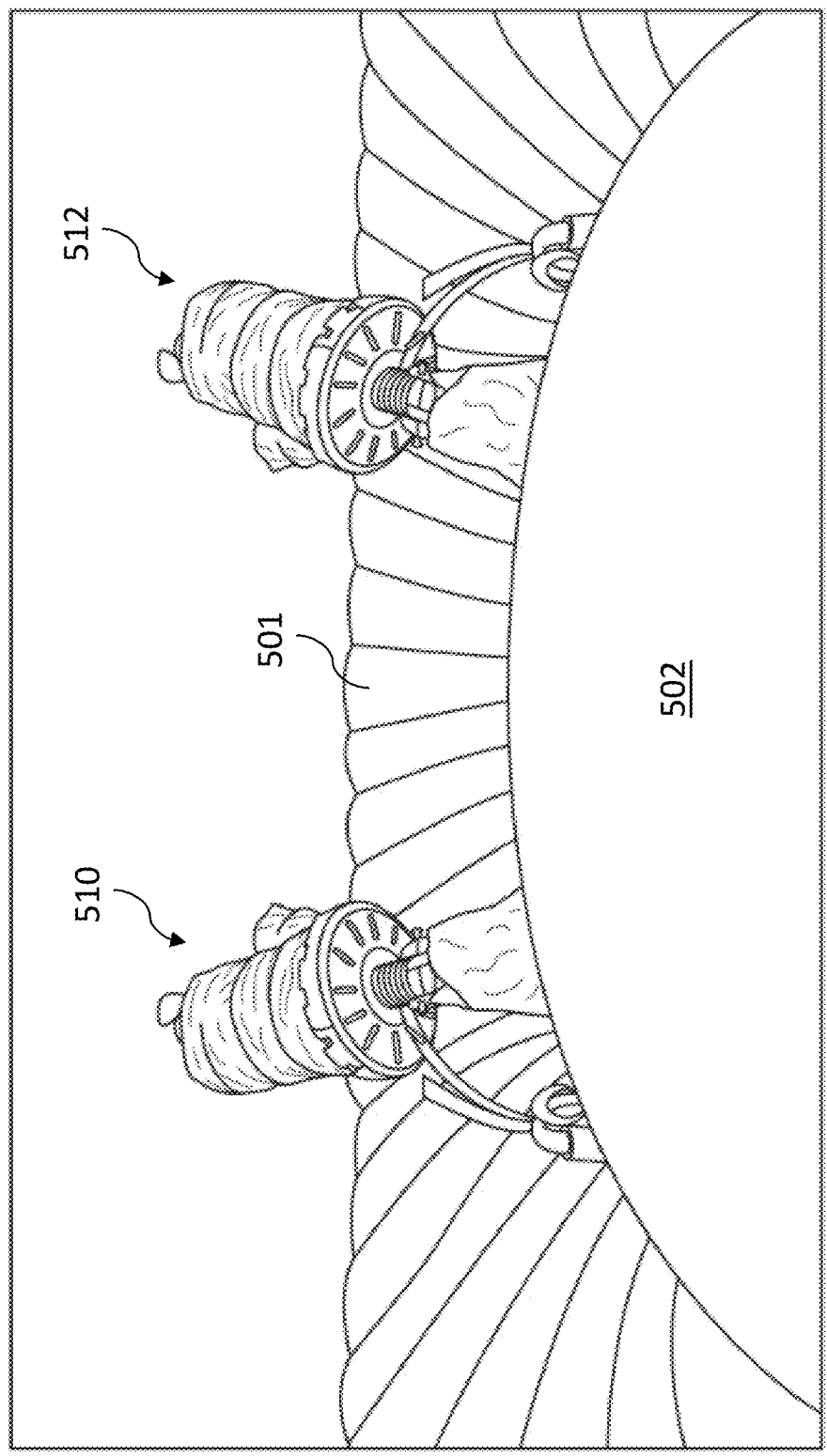
FIGS. 5A-5D are simplified schematics, each in perspective view, showing an example of a drogue deployment from an LTA vehicle at different instances in time, in accordance with some embodiments.
Figure 5B:
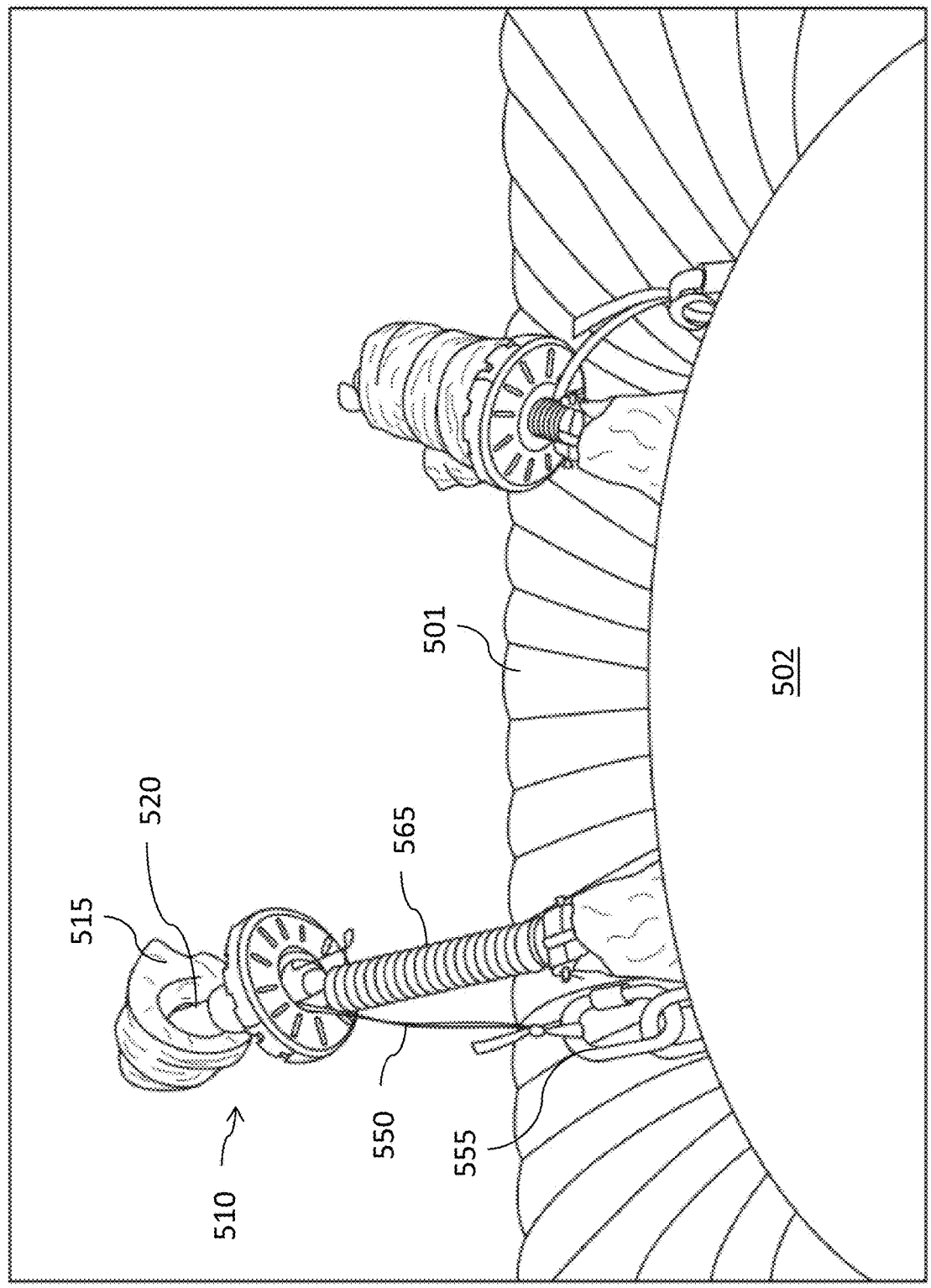
Figure 5C:
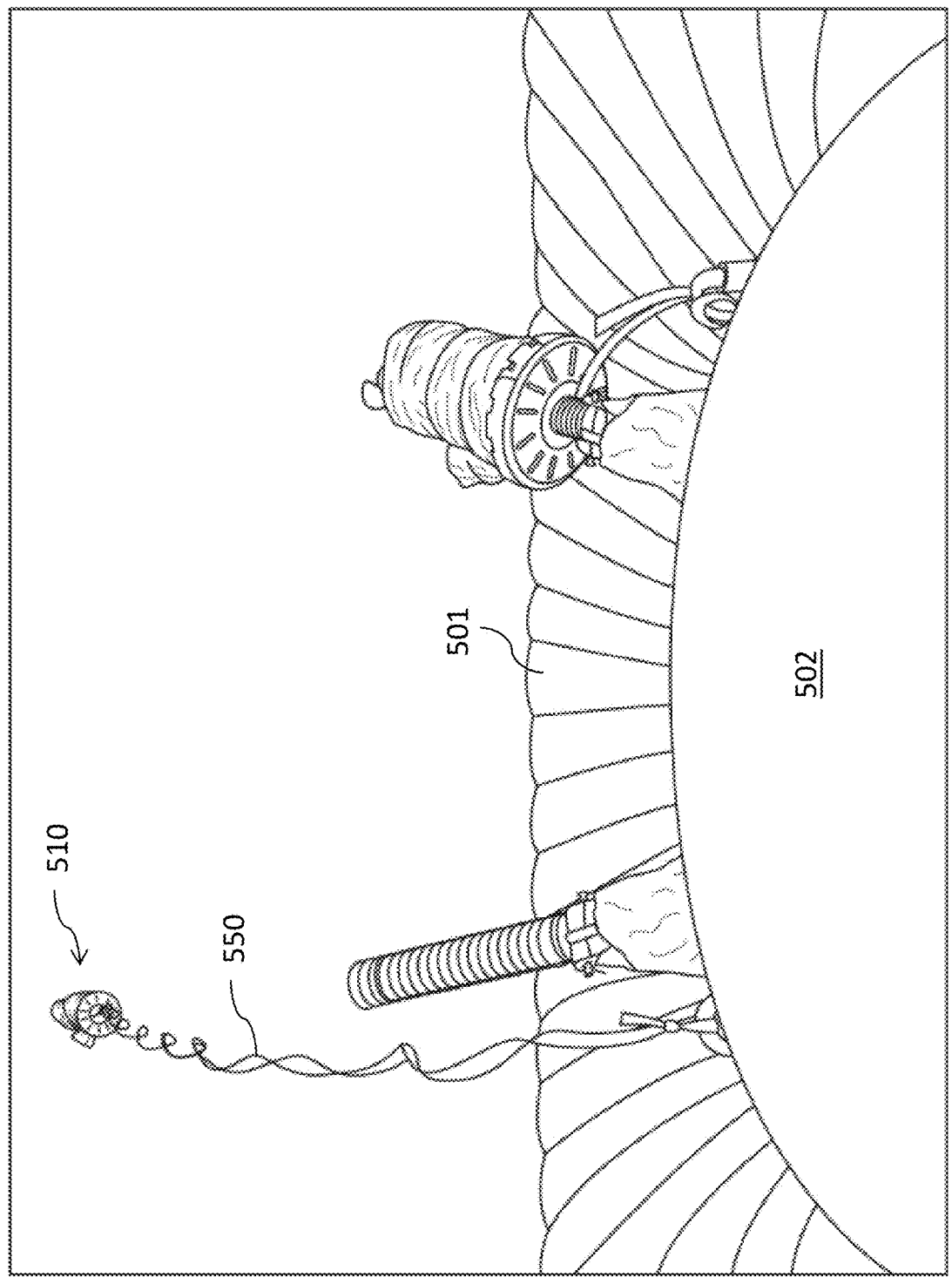
Figure 5D:
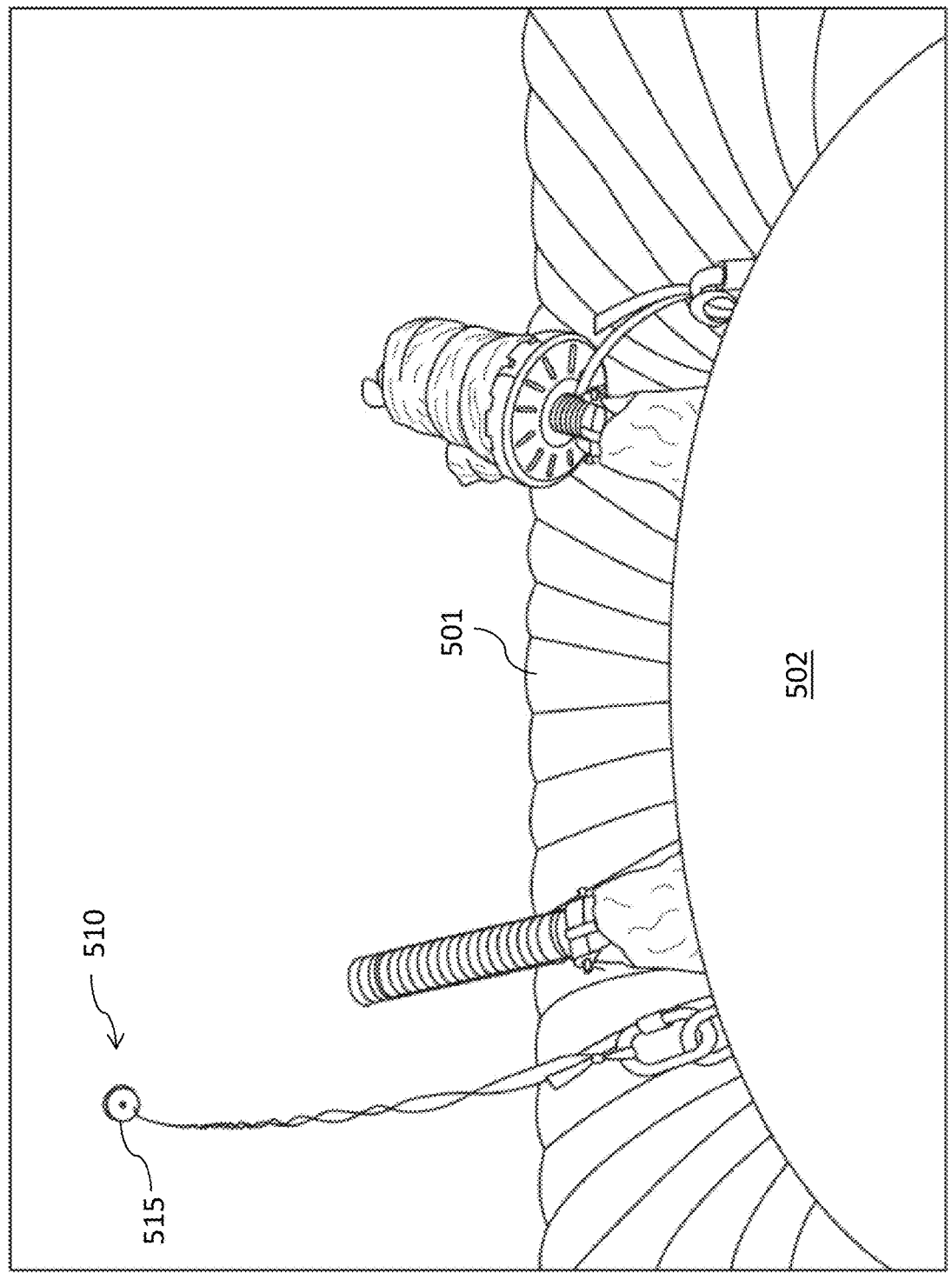

FIG. 5A shows two drogues 510 and 512 before deployment, as viewed from a perspective near the center of the apex plate 502, such that both drogues in the figure are on one side of the apex plate 502 of the LTA vehicle. FIG. 5B shows one drogue shortly after deployment. In FIG. 5B, a drogue deployment mechanism (not shown) has been triggered and the carrier 520 has been deployed due to the force from the spring 565 decompressing. The riser 550 has begun to uncoil from the drogue 510 (e.g., from a riser drum), and the coupling 555 between one end of the riser and the apex plate 502 is also visible. The parachute 515 has moved with respect to the carrier 520 at this point (shortly after deployment), but has not begun to open. FIG. 5C shows the drogue 510 after it has moved away from the apex plate of the LTA vehicle and a majority of the riser 550 has been unspooled from the drogue, but the parachute 515 is still not open. FIG. 5D shows the drogue 510 after the drogue parachute 515 has been opened.

Figure 6A:
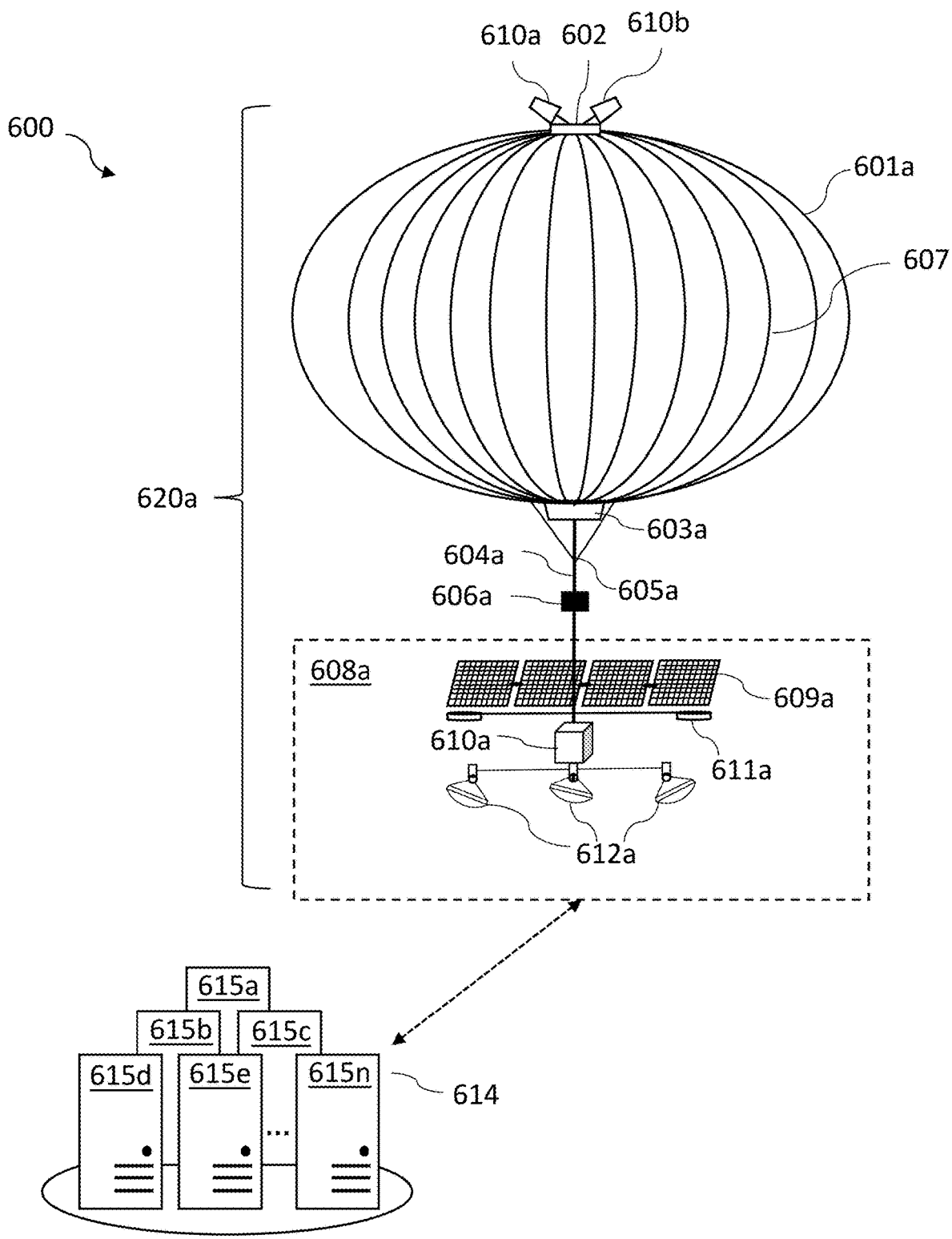
FIGS. 6A-6B are simplified schematic diagrams of example LTA unmanned aerial vehicle (UAV) systems incorporating the present drogue deployment systems, in accordance with some embodiments.
Figure 6B:
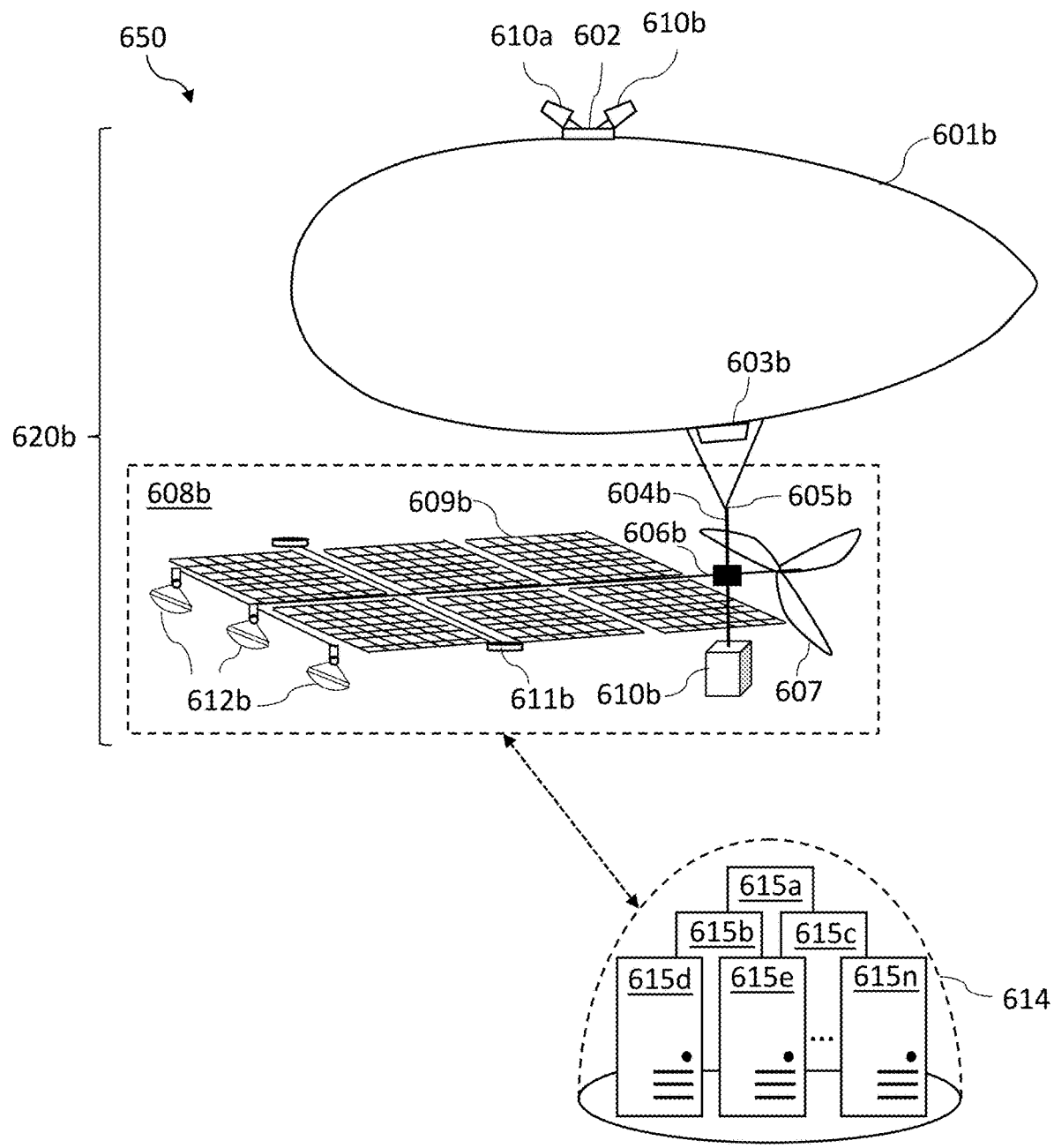

FIGS. 6A-6B are simplified schematic diagrams of example LTA unmanned aerial vehicle (UAV) systems incorporating the present drogue deployment systems, in accordance with some embodiments.

In FIG. 6A, there is shown a diagram of system 600 for navigation of aerial vehicle 620a comprising a drogue deployment system. The drogue deployment system contains two drogues 610a and 610b, and is coupled to an apex plate 602 of the LTA vehicle 100. In some examples, aerial vehicle 620a may be a passive vehicle, such as a balloon or satellite, wherein most of its directional movement is a result of environmental forces, such as wind and gravity. In other examples, aerial vehicles 620a may be actively propelled. In an embodiment, system 600 may include aerial vehicle 620a and ground station 614. In this embodiment, aerial vehicle 620a further includes balloon 601a, plate 602, altitude control system (ACS) 603a, connection 604a, joint 605a, actuation module 606a, and payload 608a. In some examples, plate 602 may provide structural and electrical connections and infrastructure. Plate 602 may be positioned at the apex of balloon 601a and may serve to couple together various parts of balloon 601a, for example using tendons 607. In other examples, plate 602 also may include a flight termination unit, such as one or more blades and an actuator to selectively cut a portion and/or a layer of balloon 601a. ACS 603a may include structural and electrical connections and infrastructure, including components (e.g., fans, valves, actuators, etc.) used to, for example, add and remove air from balloon 601a (i.e., in some examples, balloon 601a may include an interior ballonet within its outer, more rigid shell that is inflated and deflated), causing balloon 601a to ascend or descend, for example, to catch stratospheric winds to move in a desired direction. Balloon 601a may further comprise a balloon envelope comprised of lightweight and/or flexible latex or rubber materials (e.g., polyethylene, polyethylene terephthalate, chloroprene), tendons 607 (e.g., attached at one end to plate 602 and at another end to ACS 603a) to provide strength to the balloon structure, a ballonet, and other structural components. In various embodiments, balloon 601a may be non-rigid, semi-rigid, or rigid.

Connection 604a may structurally, electrically, and communicatively, connect balloon 601a and/or ACS 603a to various components comprising payload 608a. In some examples, connection 604a may provide two-way communication and electrical connections, and even two-way power connections. Connection 604a may include a joint 605a, configured to allow the portion above joint 605a to pivot about one or more axes (e.g., allowing either balloon 601a or payload 608a to tilt and turn). Actuation module 606a may provide a means to actively turn payload 608a for various purposes, such as improved aerodynamics, facing or tilting solar panel(s) 609a advantageously, directing payload 608a and propulsion units (e.g., propellers 607 in FIG. 6B) for propelled flight, or directing components of payload 608a advantageously.

Payload 608a may include solar panel(s) 609a, avionics chassis 610a, broadband communications unit(s) 611a, and terminal(s) 612a. Solar panel(s) 609a may be configured to capture solar energy to be provided to a battery or other energy storage unit, for example, housed within avionics chassis 610a. Avionics chassis 610a also may house a flight computer (e.g., to electronically control various systems within the UAV 620a), a transponder, along with other control and communications infrastructure (e.g., a computing device and/or logic circuit configured to control aerial vehicle 620a). Communications unit(s) 611a may include hardware to provide wireless network access (e.g., LTE, fixed wireless broadband via 5G, Internet of Things (IoT) network, free space optical network or other broadband networks). Terminal(s) 612a may comprise one or more parabolic reflectors (e.g., dishes) coupled to an antenna and a gimbal or pivot mechanism (e.g., including an actuator comprising a motor). Terminal(s) 612(a) may be configured to receive or transmit radio waves to beam data long distances (e.g., using the millimeter wave spectrum or higher frequency radio signals). In some examples, terminal(s) 612a may have very high bandwidth capabilities. Terminal(s) 612a also may be configured to have a large range of pivot motion for precise pointing performance. Terminal(s) 612a also may be made of lightweight materials.

In other examples, payload 608a may include fewer or more components, including propellers 607 as shown in FIG. 6B, which may be configured to propel aerial vehicles 620a-b in a given direction. In still other examples, payload 608a may include still other components well known in the art to be beneficial to flight capabilities of an aerial vehicle. For example, payload 608a also may include energy capturing units apart from solar panel(s) 609a (e.g., rotors or other blades (not shown) configured to be spun by wind to generate energy). In another example, payload 608a may further include or be coupled to an imaging device (e.g., a star tracker, IR, video, Lidar, and other imaging devices, for example, to provide image-related state data of a balloon envelope, airship hull, and other parts of an aerial vehicle). In another example, payload 608a also may include various sensors (not shown), for example, housed within avionics chassis 610a or otherwise coupled to connection 604a or balloon 601a. Such sensors may include Global Positioning System (GPS) sensors, wind speed and direction sensors such as wind vanes and anemometers, temperature sensors such as thermometers and resistance temperature detectors, speed of sound sensors, acoustic sensors, pressure sensors such as barometers and differential pressure sensors, accelerometers, gyroscopes, combination sensor devices such as inertial measurement units (IMUs), light detectors, light detection and ranging (LIDAR) units, radar units, cameras, other image sensors, and more. These examples of sensors are not intended to be limiting, and those skilled in the art will appreciate that other sensors or combinations of sensors in addition to these described may be included without departing from the scope of the present disclosure.

Ground station 614 may include one or more server computing devices 615a-n, which in turn may comprise one or more computing devices (e.g., a computing device and/or logic circuit configured to control aerial vehicle 620a). In some examples, ground station 614 also may include one or more storage systems, either housed within server computing devices 615a-n, or separately. Ground station 614 may be a datacenter servicing various nodes of one or more networks.

FIG. 6B shows a diagram of system 650 for navigation of aerial vehicle 620b. All like-numbered elements in FIG. 6B are the same or similar to their corresponding elements in FIG. 6A, as described above (e.g., balloon 601a and balloon 601b may serve the same function, and may operate the same as, or similar to, each other). In some examples, balloon 601b may comprise an airship hull or dirigible balloon. In this embodiment, aerial vehicle 620b further includes, as part of payload 608b, propellers 607, which may be configured to actively propel aerial vehicle 620b in a desired direction, either with or against a wind force to speed up, slow down, or re-direct, aerial vehicle 620b. In this embodiment, balloon 601b also may be shaped differently from balloon 601a, to provide different aerodynamic properties. In this embodiment, tendons (not shown) may also be present to couple the apex plate 602 to the other components of the aerial vehicle (e.g., to the ACS 603b, to the connection 604b, or to the joint 605b). In some cases of this embodiment, there can be more than one plate (similar to apex plate 602) with a drogue deployment system coupled to each plate. For example, a first plate with a first drogue deployment system can be coupled to the nose (or the leading edge) of the envelope 601b of aerial vehicle 620b, and a second plate with a second drogue deployment system can be coupled to the tail (or the trailing edge) of the envelope 601b of aerial vehicle 620b. In other cases, there can be a single plate, which can be coupled to a different location of envelope 601b of aerial vehicle 620b than the apex plate 602 shown in FIG. 6B. For example, the plate can be coupled to the tail (or the trailing edge) of the envelope 601b of aerial vehicle 620b, and before deploying the drogues, the aerial vehicle 620b can maneuver such that the nose of the aerial vehicle is pointed downwards (toward the ground) and the drogues can be deployed upwards from the tail of the envelope 601b of the aerial vehicle 620b.

As shown in FIGS. 6A-6B, aerial vehicles 620a-b may be largely wind-influenced aerial vehicles, for example, balloons carrying a payload (with or without propulsion capabilities) as shown. However, those skilled in the art will recognize that the systems disclosed herein may similarly apply and be usable by various other types of LTA aerial vehicles.

Example Methods

Figure 7:
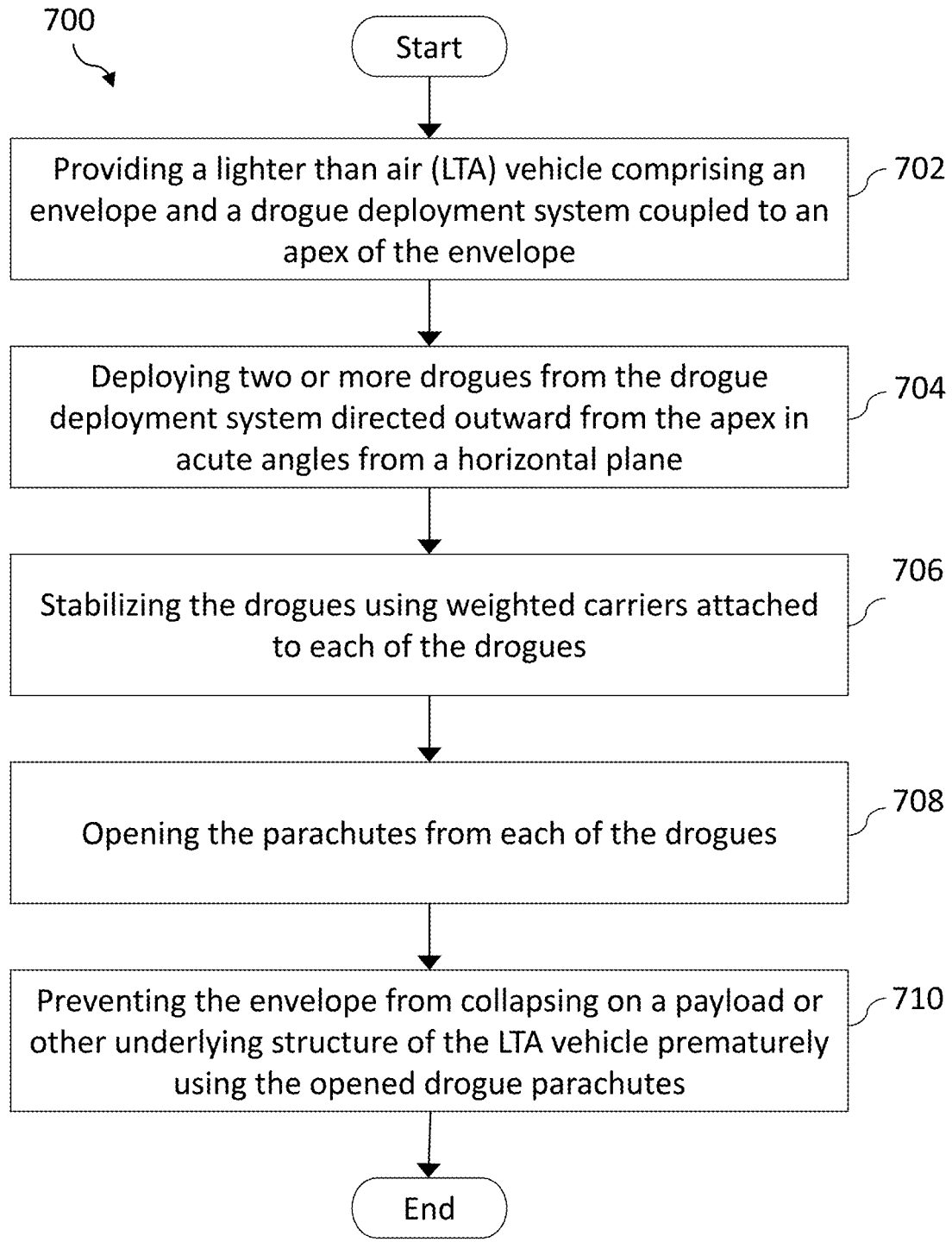
FIG. 7 is a flowchart for a method for deploying drogues from an LTA vehicle, in accordance with some embodiments.
Figure 8:
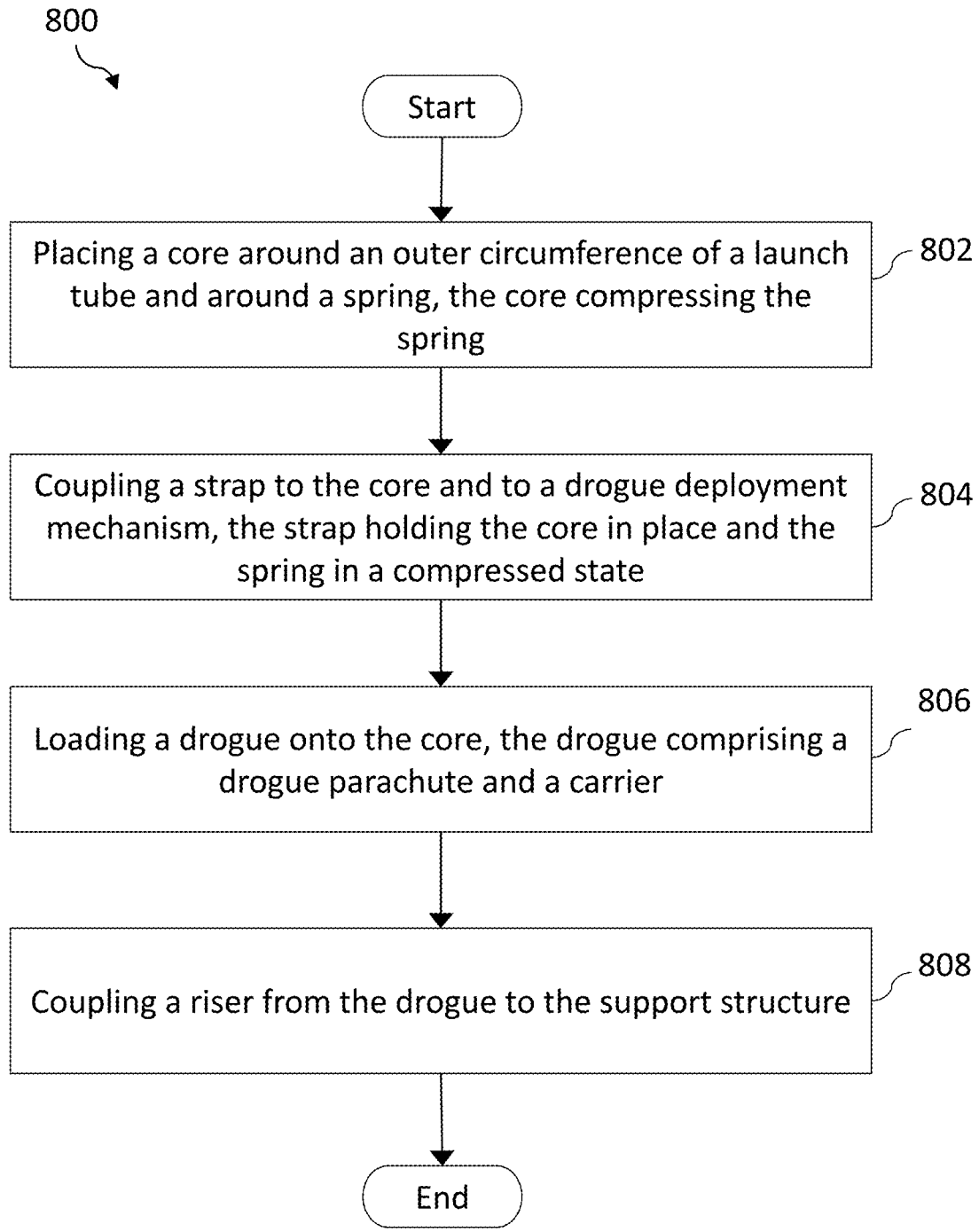
FIG. 8 is a flowchart for a method for loading drogues in a drogue deployment system for an LTA vehicle, in accordance with some embodiments.

In some embodiments, a method 700 of deploying drogues from an LTA vehicle includes the steps shown in FIG. 7. At step 702 of method 700, an LTA vehicle is provided comprising an envelope and a drogue deployment system coupled to an apex of the envelope of the LTA vehicle (e.g., using an apex plate). At step 704, two or more drogues are deployed from the drogue deployment system directed outward from the apex in acute angles (e.g., from 0° to 45° from a horizontal plane. The drogue deployment in step 704 may be initiated manually or automatically using any of the mechanisms described herein. The drogues deployed in step 704 each contain a weighted carrier and a drogue parachute. In step 706, the weighted carriers are used to stabilize each of the drogues. For example, the weighted carriers can assist with orienting the drogues (e.g., such that the parachutes can open above the carrier with respect to the force of gravity and catch passing air to inflate) after the drogues are deployed and before the drogue parachutes open. At step 708, the parachutes are opened from the drogues. The drogue parachutes may be opened in step 708 using any of the mechanisms described herein. At step 710, the envelope is prevented from collapsing on a payload or other underlying structure of the LTA vehicle prematurely using the opened drogue parachutes. The drogue parachutes can also increase the descent velocity of the LTA vehicle in the initial stages of descent (i.e., before a main parachute is opened) by applying a force that streamlines the envelope. In some cases, an additional step after step 710 may be added in which one or more main parachutes are deployed (e.g., one coupled to the payload and one coupled to the envelope) to slow the descent velocity of the LTA vehicle In some embodiments, a method 800 of loading drogues in a drogue deployment system for an LTA vehicle includes the steps shown in FIG. 8. At step 802, a core is placed around an outer circumference of a launch tube and around a spring, where the core compresses the spring. In some cases, the launch tube is coupled to the apex plate using a support structure, and the launch tube is directed outward from the apex in an acute angle from a horizontal plane. At step 804, a strap is coupled to the core and to a drogue deployment mechanism, where the strap holds the core in place and the spring in a compressed state. For example, the drogue deployment mechanism 470 shown in FIG. 4 can be used to perform this step by coupling the strap 474 (which is connected to a core that is not shown) to the squib 472. In other variations of method 800, a different component (rather than a strap) can be used to hold the core in place and the spring in a compressed state, such as a clip or a pin. In such cases, the drogue deployment mechanism can release the component (e.g., unclip the clip or remove the pin) to release the core and allow the spring to decompress. In some cases, after step 804 and before step 806, a safety pin (e.g., element 490 in FIG. 4) can be inserted (e.g., through holes in the core and the launch tube) as an extra precaution to prevent the spring from decompressing prematurely. In some cases, the safety pin can be removed before step 806. In step 806, a drogue is loaded onto the core, where the drogue comprises a drogue parachute and a carrier. In some cases, the carrier can be coupled to the core such that the core travels with the drogue after the drogue is deployed, while in other cases, the core can push the drogue off of the launch tube, but does not travel with the drogue after deployment (e.g., the core can fall away after the drogue is deployed, in some cases). At step 808, a riser is coupled from the drogue to the support structure. As described herein, this method may be implemented on an LTA vehicle comprising an envelope and a drogue deployment system coupled to an apex of the envelope.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements.

What is claimed is:

1. A drogue deployment system for a lighter than air (LTA) vehicle descent, the drogue deployment system comprising:
   a drogue comprising a drogue parachute coupled to a carrier, wherein the drogue parachute is configured to be wrapped around the carrier prior to deployment and to open after deployment;
   a launch tube coupled to an apex of an envelope of the LTA vehicle, the launch tube directed outward from the apex in an acute angle from a horizontal plane;
   a spring winding around the launch tube, the spring configured to launch the drogue;
   a core placed around an outer circumference of the launch tube and placed around the spring, the core compressing the spring and holding the spring in a compressed state prior to deployment; and
   a riser coupling the carrier to the envelope of the LTA vehicle,
   wherein:
   the carrier is placed over and substantially covers the launch tube and the core, the carrier comprising a narrower circumference in a portion beyond the core such that the spring can push the carrier off of the launch tube upon deployment; and
   the riser is connected to the carrier in a coiled manner.

2. The drogue deployment system of claim 1, wherein:
   the drogue deployment system deploys two or more drogues positioned at intervals away from one another; and
   the two or more drogues are each configured to deploy from the drogue deployment system at acute angles from a horizontal plane.

3. The drogue deployment system of claim 2, wherein the intervals between the two or more drogues and the acute angles are selected such that horizontal components of drogue deployment forces used to deploy the two or more drogues approximately cancel out.

4. The drogue deployment system of claim 2, wherein the intervals between the two or more drogues and the acute angles are selected such that the drogues do not make contact with the apex of the lighter than air vehicle after the drogues are deployed and before the drogue parachutes are opened.

5. The drogue deployment system of claim 2, wherein the drogue deployment system deploys two drogues positioned at intervals of 180°, three drogues positioned at intervals of 120°, four drogues positioned at intervals of 90°, or six drogues positioned at intervals of 60°.

6. The drogue deployment system of claim 1, wherein the coiled riser is contained in a riser drum attached to the drogue carrier and unspools from the riser drum after the drogue is deployed.

7. The drogue deployment system of claim 1, wherein the drogue is configured to pull up on the envelope with respect to a payload of the lighter than air vehicle (LTA) vehicle, thereby reducing the chance that the envelope will impact with the payload of the LTA vehicle during descent.

8. A lighter than air vehicle comprising:
   an envelope configured to hold gas and air; and
   a drogue deployment system, comprising:
      two or more drogues each comprising a carrier and a drogue parachute, each drogue directed outward from the apex in an acute angle from a horizontal plane at an interval away from another of the two or more drogues;
      two or more launch tubes coupled to an apex of the envelope;

two or more springs, each spring winding around one of the launch tubes;

two or more cores, each core placed around an outer circumference of the one of the launch tubes and placed around one of the springs, each core compressing one of the springs and holding that spring in a compressed state prior to deployment; and two or more risers, each riser configured to couple one of the carriers to the apex of the envelope;

wherein:

each of the carriers is placed over and substantially covers one of the launch tubes and one of the cores;

each of the carriers comprises a narrower circumference in a portion beyond one of the cores such that the springs can push the carriers off of the launch tubes upon deployment;

each of the drogue parachutes is coupled to one of the carriers, and is configured to be wrapped around one of the carriers prior to deployment and to open after deployment;

each riser is connected to one of the carriers in a coiled manner; and the interval between each of the two or more drogues and the acute angles are selected such that horizontal components of drogue deployment forces used to deploy the two or more drogues approximately cancel out.

9. The lighter than air (LTA) vehicle of claim 8, wherein the intervals between the two or more drogues and the acute angles are selected such that the drogues do not make contact with the apex of the LTA vehicle in a time frame after the drogues are deployed and before the drogue parachutes are opened.

10. The lighter than air vehicle of claim 8, wherein the drogue deployment system deploys two drogues positioned at intervals of 180°, three drogues positioned at intervals of 120°, four drogues positioned at intervals of 90°, or six drogues positioned at intervals of 60°.

11. The lighter than air vehicle of claim 8, wherein the coiled riser is contained in a riser drum attached to the drogue carrier and unspools from the riser drum after the drogue is deployed.

12. The lighter than air (LTA) vehicle of claim 8, wherein the drogues are configured to pull up on the envelope with respect to a payload of the LTA vehicle, thereby reducing the chance that the envelope will impact with the payload of the LTA vehicle during descent.

13. The lighter than air (LTA) vehicle of claim 8, further comprising a payload comprising a solar panel, a broadband communications unit, and a terminal, wherein the drogues are configured to pull up on the envelope with respect to the payload, thereby reducing the chance that the envelope will impact with the solar panel, broadband communications unit, or terminal of the LTA vehicle during descent.

* * * * *